United States Patent [19]

Duck et al.

[11] 4,322,713

[45] Mar. 30, 1982

[54] LEVEL MONITORING METHODS AND APPARATUS PARTICULARLY FOR HIGH-RESISTIVITY LIQUIDS

[76] Inventors: Sherman W. Duck, 332 C St., Redwood City, Calif. 94063; Rino Ammenti, 5 Bertocchi La., Millbrae, Calif. 94030

[21] Appl. No.: 128,434

[22] Filed: Mar. 10, 1980

[51] Int. Cl.³ .............................................. G08B 21/00
[52] U.S. Cl. ..................................... 340/59; 340/620; 73/293
[58] Field of Search ................. 340/52 R, 52 B, 52 F, 340/59, 612, 618, 620; 73/293

[56] References Cited

U.S. PATENT DOCUMENTS

| | | |
|---|---|---|
| 1,285,986 | 11/1918 | Grafford . |
| 2,624,790 | 1/1953 | White . |
| 2,688,251 | 9/1954 | Kelly . |
| 2,792,566 | 5/1957 | Shanhouse et al. . |
| 3,038,097 | 6/1962 | De Graffenried . |
| 3,054,291 | 9/1962 | Landwer . |
| 3,181,361 | 5/1965 | Bell . |
| 3,350,710 | 10/1967 | Bridges . |
| 3,466,928 | 9/1969 | Kind . |
| 3,495,214 | 2/1970 | Wishart . |
| 3,550,080 | 12/1970 | Wenzel . |
| 3,593,270 | 7/1971 | Walker .................................. 340/59 |
| 3,848,616 | 11/1974 | Sanner . |
| 3,975,582 | 8/1976 | Ford . |

FOREIGN PATENT DOCUMENTS 1130621 10/1968 United Kingdom .

OTHER PUBLICATIONS

Wesley Iversen; Electronics Review; Jul. 1979; Sensors Respond to Fluid Level; pp. 53, 54, 56.

*Primary Examiner*—Alvin H. Waring
*Attorney, Agent, or Firm*—Benoit Law Corporation

[57] ABSTRACT

An electronic dipstick or similar probe has an electrically insulated conductor which is diminished or otherwise adjusted with respect to a given point of reference and a predetermined low liquid level. Level monitoring functions on liquids having high volume resistivities in the megohm-centimeter range are attainable.

42 Claims, 7 Drawing Figures

LEVEL MONITORING METHODS AND APPARATUS PARTICULARLY FOR HIGH-RESISTIVITY LIQUIDS

BACKGROUND OF THE INVENTION

1. Field of the Invention

The subject invention relates to condition responsive indicating systems and, more specifically, to methods and apparatus for electrically or electronically monitoring liquid levels, with particular reference to liquids having volume resistivities in the megohm-centimeter range.

2. Disclosure Statement

This disclosure statement is made pursuant to the duty of disclosure imposed by law and formulated in 37 CFR 1.56(a). No representation is hereby made that information thus disclosed in fact constitutes prior art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention.

By way of example, and not by way of limitation, the subject invention may profitably be considered against the background and in the context of lubrication oil level monitoring systems for automotive engines.

In this respect, the currently standard and almost universal technique of checking lubrication oil levels in automotive engines requires the performance of several manual steps which typically cannot be carried out without physical exertion and soiling of hands, and which involve the release and elevation of the engine hood, removal and wiping of the oil dipstick, reinsertion of the wiped dipstick into and through a narrow tube, renewed removal of the thus reinserted dipstick, inspection of an oil deposit on the dipstick in relationship to graduated markings near the dipstick end, reinsertion of the dipstick into the dipstick tube, and reclosure of the engine hood, sometimes after addition of lubrication oil, such as may be necessary.

The tediousness of this low-technology approach involves the risk that oil checks may not be carried out with sufficient frequency as to assure detection of dangerously low oil levels from which severe engine damage can easily result. The current proliferation of self-service stations and a general lessening of station attendant service, accelerated in some parts by gas shortage phenomena, have considerably aggravated the problem.

It would thus be highly convenient and advantageous to have an oil level monitoring system that would be easily and reliably surveyable from the driver's seat of an automobile. Existing proposals, unfortunately, fell short of this goal.

In particular, the rain alarm of U.S. Pat. No. 1,285,986, with its interdigitated electrode sets, battery-operated bell and canvass canopy, obviously would be ill-suited for a level monitoring device. The disclosure of U.S. Pat. No. 2,624,790 represents a thirty-year-old attempt to replace an automobile engine dipstick by an automatic device. To this end, an auxiliary pump having its intake at the low-oil level was employed to pump oil to an electric pressure sensing device, as long as there was sufficient oil in the crankcase. In practice, this approach would have called for expensive extra equipment of a relatively delicate nature.

Similar considerations apply to a proposal according to U.S. Pat. No. 2,688,251, which employs manifold vacuum for operating a pneumatic oil level indicating system.

The liquid level detector proposal according to U.S. Pat. No. 2,792,566 energizes two electrodes of unequal lengths with direct current and with alternating current, respectively, to indicate different liquid levels through the glowing of both or only one electrode of a gas-discharge lamp. In practice, application to the oil being monitored of the relatively high voltage needed for the operation of such a lamp would have created a fire hazard. Similar considerations apparently dictated the construction of the elongate tube housing the electrodes of glass or plastic, which would have been ill-suited for an automotive engine environment.

The same in effect applies to the electroluminescent liquid level indicator proposed in U.S. Pat. No. 3,038,097.

U.S. Pat. No. 3,054,291 proposes an illuminated liquid gage in which oil in the crankcase uncovers a color line when the oil level reaches a low level, so as to change the hue of a signal light transmitted through a transparent rod to the dashboard. In practice, such transmitted light is difficult to observe in daylight. Also, the light guide probe will in practice become covered by an oil film, whereby the system will erroneously indicate a sufficient oil level even after the oil has receded to dangerously low levels. The materials suggested for that light transmitting gage moreover are vulnerable to the engine heat and to hot oil vapors.

The proposal of U.S. Pat. No. 3,181,361 employing a spark gap probe energized by a high-voltage transformer and operated via a cable and pulley suspension, is at best suitable for stationary installations and non-flammable liquids, such as molten glass.

Liquid level indicators of the type proposed in U.S. Pat. No. 3,350,710 determine the presence and absence of liquids by means of a temperature sensing technique. One problem with such systems is an inherent time delay in conflict with the need to provide the driver with a quick indication upon his actuation of the indicator actuation button. In an attempt to alleviate this problem, the proposal according to that patent suggests that a very fine wire of high temperature coefficient material be immersed into the particular liquid, which is supposed to keep the immersed wire relatively cool. The wire is positioned such that the liquid level will sink below the wire when the liquid level reaches a low value. In that case, the electrically heated wire is supposed to rise rapidly in temperature because of a lack of a heat sink through the particular liquid.

In fact, the heat developed by the passage of electric current is made sufficient to evaporate any liquid from the wire at that stage. This is, however, a rather dangerous practice, particularly in engine crankcase environments containing oil vapors. Also, a cooling effect through heat of evaporation would appear to introduce a time delay of its own as far as the electrically heated wire is concerned. A related system which relies on the temperature dependence of the resistivity of silicon to differentiate between the presence or absence of a liquid, such as lubrication oil, has been described in an article entitled *Sensors Respond to Fluid Level*, having appeared in ELECTRONICS, July 5, 1979, pp. 53 to 56.

British Patent Specification No. 1,130,621 proposes the use of two bare electrodes of equal lengths in a water sensor employed in water tanks and overflow pipes of individual units in multi-apartment dwellings. In practice, bare electrode systems would be difficult to implement in an engine crankcase or similar environment, especially if two parallel electrodes of equal lengths are to be employed, as suggested in this British proposal.

A variation on the theme of the above mentioned U.S. Pat. No. 3,054,291 is apparent from U.S. Pat. No. 3,466,928, which suggests the use of fiber optics technology for transmitting a crankcase oil level indication to the dashboard of an automobile. As can be seen from that proposal, a coherent fiber optics system of high temperature stability is required in addition to a rather complex illumination system through the crankcase wall.

Moreover, though the particular proposal suggests a coating of essential optical parts with fluorinated ethylene-propylene or other non-wetting material, it appears questionable to what extent such measures will prevent the optical system over the life of the engine from becoming obstructed or otherwise affected by oil films forming on mirror and window surfaces essential to the operation of the system.

U.S. Pat. No. 3,495,214 proposes a transistorized system with an electrode probe partially immersed in a liquid and colored lights at the dashboard for liquid level indication. A problem with this and similar electrical sensing systems is that they cannot distinguish in their indication between a satisfactory liquid level and a failure of the electrode probe insulation. In either case, the driver will be given the green light in response to his actuation of the indicator switch, and will thus be led to believe that the liquid level remains to be satisfactory, even after having receded to dangerously low levels. In practice, probe insulation failures are immune to detection through the type of electric testing procedures proposed in the mentioned U.S. Pat. No. 3,495,214. These problems are further aggravated by an electrode probe structure in which the electrode is separated from closely adjacent metallic parts by insulating material which presents around the electrode an at least practically horizontal surface extending parallel to and facing the level of the liquid being monitored. An excessive liquid level will thus tend to leave a conductive oil deposit between the probe electrode and adjacent metallic parts, even after the liquid has receded to a normal range of levels.

This kind of drawback affects also the bare electrode structure shown in U.S. Pat. No. 3,550,080 and the concentric electrode structure shown in FIG. 6 of U.S. Pat. No. 3,848,616. That patent alternatively suggests the use of interdigitated electrodes of the kind proposed for the rain alarm shown in the above mentioned U.S. Pat. No. 1,285,986. Those interdigitated electrode structures in practice are, however, largely insensitive to changes in liquid level across most of their width or length.

The fluid level sensing probe according to U.S. Pat. No. 3,975,582 has a slender insulating bushing of thermoplastic material extend along part of a metal electrode and joined to and surrounded by a thin-walled concentric cup-shaped shell of semirigid plastics material. In order to mount that probe in operative condition, the cup-shaped shell is snapped into position at a cylindrical seating in a hole in the liquid container wall. An alternative proposal dispenses with the slender insulating bushing in favor of an extended shell or shroud surrounding part of the electrode. It is at least questionable to what extent a horizontally mounted probe as shown in the latter patent will satisfy liquid level monitoring needs of the type primarily under consideration herein. Also, it appears that the provision of a hole in the liquid container wall renders the system vulnerable to sudden loss of the oil or other liquid being monitored. This problem appears aggravated in the cited proposal which places reliance for sealing the particular hole on a snap fit of a semirigid plastic part.

A pneumatic oil level checking device has recently become commercially available under the designation "OIL CHEK". That system has a probe in the form of a tube which originally is longer than the distance from the top of the dipstick tube to the low oil level. Prior to insertion of that probe into the dipstick tube, the probe is cut to correspond in length to the regular dipstick of the particular engine down to the "add oil" mark. Thin tubing pneumatically connects the probe to a plunger arrangement at the dashboard or steering wheel column. That arrangement has a piston which is actuated in a cylinder by the manually actuable plunger, in order to propel air through the tubing into the probe when the plunger is depressed. If the oil level in the crankcase has receded from the free end of the probe, air can enter its longitudinal passage, whereby the depressed plunger will pop out of the dashboard or steering column unit. On the other hand, if the free end of the probe is immersed in oil, air cannot enter the probe from the free end thereof and the plunger will stay in the checking unit, indicating to the driver or operator the presence of oil at a satisfactory level. As a safety against faulty indications in this respect, the checking unit includes a check button which, when depressed will cause the plunger or indicator to pop out immediately. However, no safety check is apparent which would afford a distinction between air leaks in the system and insufficient oil levels, except that provisions are made for a use of the tubular probe in the manner of a conventional dipstick.

A further proposal advanced by one of the subject coinventors provides an electronic dipstick in the form of an elongate base member having a pair of leads with spaced terminals located thereon.

The base member is of electrically insulating material, or the leads and terminals are otherwise insulated from each other. Liquid present at a satisfactory level will bridge the spaced terminals, thereby permitting flow of an electric indicating current. On the other hand, liquid receding to an insufficient level will leave the terminals in an open-circuit condition. Two pairs of terminals may be employed for an indication of high, medium and low liquid levels. A conical stop element tapering in a direction toward the upper end of the elongate base member is slidable along that base member, has a set screw for releasably securing such stop element to the base member according to the length of the dipstick receiving tube, and has a second screw disposed to releasably bear against the outer surface of the dipstick receiving tube to prevent lifting of the base member out of that tube.

Such type of electronic dipstick appears exposed to the danger of residual oil films and contamination deposits bridging the spaced terminals on or at the base member, and thereby causing the provision of a faulty indication, even after the liquid or oil has receded to an insufficient level. This problem appears aggravated in the case of engine oils which have a high volume resistivity in the megohm-centimeter range, comparable to the resistivity of residual oil or contaminant films.

On the subject of slidable stop members, it is mentioned that there are so-called "universal" conventional dipsticks having a stop member adjustable along the dipstick rod or blade.

SUMMARY OF THE INVENTION

It is a general object of this invention to overcome the disadvantages and satisfy the needs expressed and implicit in the above disclosure statement and in other parts hereof.

It is a germane object of this invention to provide improved methods and apparatus for monitoring the level of a liquid, particularly of an electrically conductive liquid.

It is a related object of this invention to provide improved methods and apparatus for monitoring liquids of high-volume resistivity, typically in the megohm-centimeter range.

It is also an object of this invention to immunize monitoring methods and apparatus against dangerous and costly malfunctions.

It is a related object of this invention to provide improved monitoring methods and apparatus which in practice are insensitive to liquid or oil level variations above the lowest satisfactory level.

It is also an object of this invention to provide electronic dipsticks and similar articles of manufacture for monitoring the level of electrically conductive liquids.

Other objects will become apparent in the further course of this disclosure.

From a first aspect thereof, the subject invention resides in methods and apparatus for monitoring the level of electrically conductive liquid wherein the length of an electrically insulated conductor is diminished or otherwise adjusted with respect to a given point of reference and a predetermined low liquid level.

According to a preferred embodiment of the invention, an elongate electric conductor is provided with a length, relative to a point of reference, greater than the distance between such point of reference at a predetermined low level of the liquid to be monitored. The elongate conductor is electrically insulated by providing such elongate conductor with electric insulation for a length which, relative to the mentioned point of reference, is greater than the mentioned distance. This, in practice, enables an installer or customer to adapt the length of the insulated conductor to the requirements of a particular engine, by cutting the conductor and its electric insulation at the mentioned predetermined low liquid level to diminish the length of the insulated conductor with respect to the point of reference to a length equal to the mentioned distance and by providing the conductor at a position corresponding to the predetermined low level relative to the point of reference with an end free of electric insulation. The user then inserts the insulated conductor of diminished length into the container of the liquid to be monitored, to position the free end of the conductor at the location of the predetermined low level. The subject embodiment of the invention then electrically monitors the level of the liquid with the inserted insulated conductor exposed to the electrically conductive liquid at its free end.

From a related aspect thereof, the subject invention resides in methods and apparatus for monitoring liquids having volume resistivities in the megohm-centimeter range, with the aid of an elongate electric conductor having a free end at a position corresponding to a predetermined low-liquid level.

According to an embodiment of the subject invention, electric monitoring circuit means are connected to and mounted on the elongate electric conductor at an end opposite the mentioned free end.

Other aspects of the subject invention, and clarifications and elaborations on statements so far made, will become apparent from the description of preferred embodiments set forth below in conjunction with the drawings. This relatively brief summary of the invention is neither intended as a substitute for the claims of this application nor as a limiting influence on the ultimately granted patent rights.

BRIEF DESCRIPTION OF THE DRAWINGS

The subject invention and its various aspects and objects will become more readily apparent from the following detailed description of preferred embodiments thereof, illustrated by way of example in the accompanying drawings in which like or functionally equivalent parts are designated by like reference numerals, and in which.

DESCRIPTION OF PREFERRED EMBODIMENTS

Figure 1:
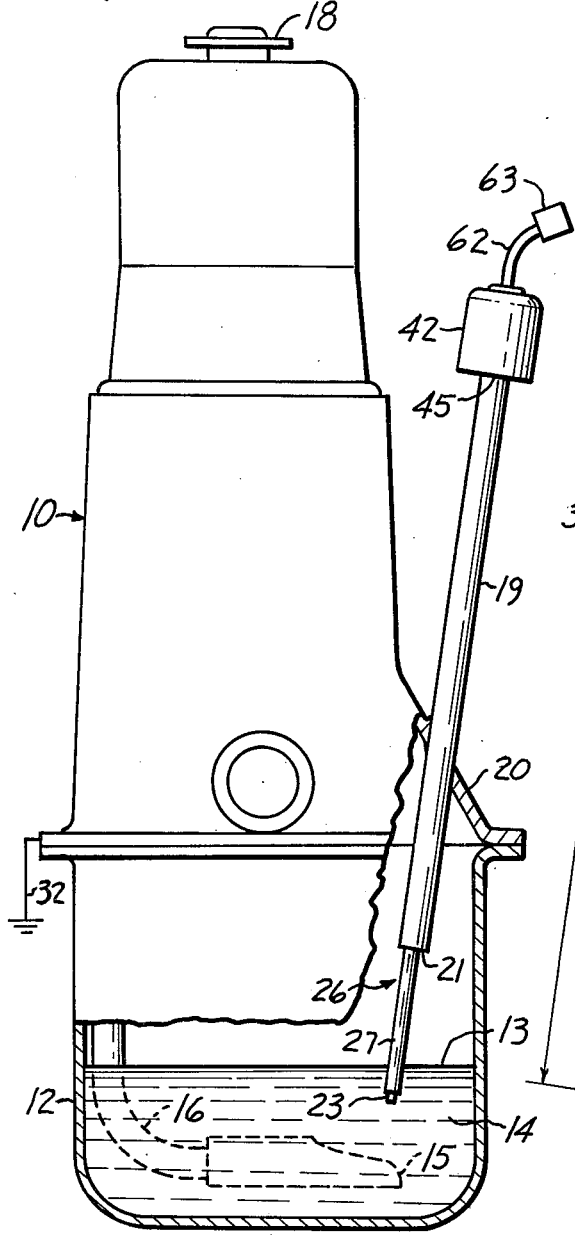
FIG. 1 is a diagrammatic front elevation, in section, of an automotive engine equipped with an electronic dipstick according to a preferred embodiment of the subject invention.

The automotive engine 10 shown in FIG. 1 has a metal container 12 attached thereto, including the familiar crankcase sump 13.

The sump 13 contains lubricating oil 14 which is circulated by an oil pump (not shown) via a strainer 15 and oil pipe 16, to return to the sump, typically by force of gravity, upon lubrication of various engine parts, and passage through an oil filter. In accordance with standard practice, the supply of lubricating oil 14 in the sump 13 may be replenished through a top opening normally closed by a removable cap 18.

A dipstick tube 19 extends through a wall 20 of the engine. In particular, the tube 19 extends from the outside of the container 12 or of the engine 10 from above the liquid 14 to an end 21 of the tube inside the container 12 or at any rate inside the container enclosing the oil sump and engine crankcase.

The metallic or electrically conductive tube 19 is electrically connected to the container 12 via the engine wall 20, for instance.

Figure 2:
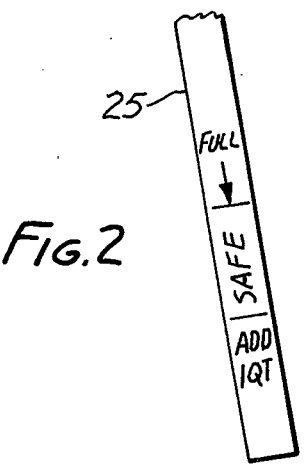
FIG. 2 is an elevation, on an enlarged scale, of the end of a conventional dipstick, shown for the purpose of comparison and explanation.

An elongate electric conductor 22 (see FIG. 3) is extended through the tube 19 into the liquid 14 and has or is provided with a free end 23 at a position corresponding to a predetermined low level of the liquid 14. In this respect, reference may be had to FIG. 2, showing an end portion of a conventional dipstick 25 provided with markings showing a satisfactory oil level and indicating also an unsatisfactory or insufficient level. In particular, the designation FULL indicates a satisfactory oil level.

The legend ADD 1 QT indicates an unsatisfactory or low level, while the optional word SAFE designate a range within which the oil level may vary. By way of example, the free end 23 of the conductor 22 may in its inserted position be located at the level of the mark associated with the legend ADD 1 QT on the dipstick end portion shown in FIG. 2.

An electronic dipstick according to the subject invention is employed in lieu of the conventional dipstick 25 as shown, for instance, in FIG. 1. The electronic dipstick 26 thus shown includes an electric insulation 27. In particular, the insulation 27 extends along the conductor 22 in the tube 19 and isolates the free end 23 of the conductor from the tube 19 below the tube end 21.

The latter isolation of the free conductor end 23 from the tube end 21 is an important feature of the currently discussed aspect of the subject invention. In particular, the invention thus avoids the drawbacks of the above mentioned proposals in which conductive oil deposits were left between the probe electrode and adjacent metallic parts, even after the oil or other liquid had receded to a normal range of levels or to an unsatisfactory low level. In addition to the electrical insulation provided at 27, the extension and arrangement of the insulation also afford a physical isolation of the probe end 23 from metallic parts. It will be noted in this respect that the insulation 27 between the metal tube 21 and probe end 23 extends at an acute angle to the vertical, thereby promoting the flowing off or removal of an oil film which may accidentally be formed between the tube end 21 and probe end 23 during the operation of the engine or in case of an overfill condition. If desired, the insulation 27 between the metal tube 21 and probe end 23 may in fact extend vertically or perpendicularly to the liquid or oil level or surface.

Figure 3:
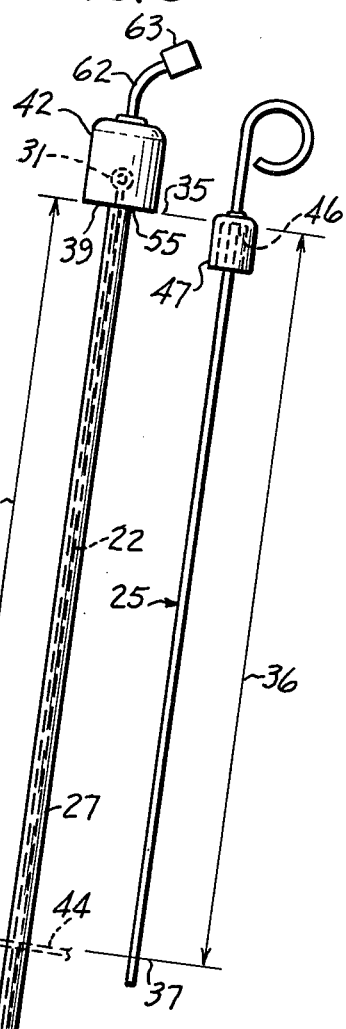
FIG. 3 is a side view of an electronic dipstick device and of an illustration of its adjustment to a useful length, in accordance with an embodiment of the subject invention.
Figure 7:
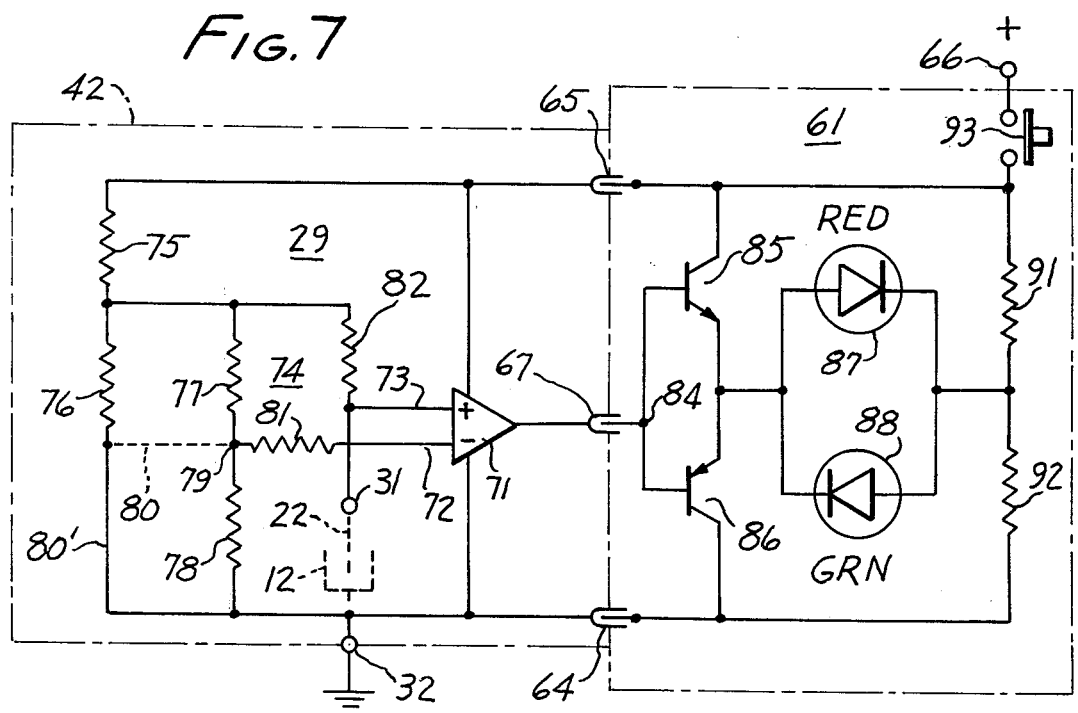
FIG. 7 is a diagram of a monitoring circuit for use with the dipsticks of FIGS. 1, 3, 4, 5 and 6, in the best mode currently contemplated of carrying out the subject invention.

The electronic dipstick 26 is operated with the aid of a monitoring circuit 29 having an input terminal 31 and a ground terminal 32 (see FIGS. 3 and 7). The input terminal 31 of the monitoring circuit 29 is electrically connected to the conductor 22 outside of the electrically conductive container 12, in a bottom region of which the oil or liquid 14 is located. The ground terminal 32, on the other hand, is electrically connected to the container 12, as diagrammatically indicated in FIG. 7.

In apparatus for monitoring the level of an electrically conductive liquid 14 in a container 12, the subject invention in its currently discussed embodiment thus provides an improvement comprising, in combination, an elongate electric conductor 22 extending into the container 12 and having a free end 23 exposed to the liquid 14, electric insulation 27 covering the conductor 22 up to its free end 23, and means 29 connected to the conductor 22 remotely from the free end 23 for electrically monitoring the level of the liquid 14 with the conductor 22 covered by the electric insulation 27 and exposed to the electrically conductive liquid at the mentioned free end 23.

Similarly, with specific reference to FIG. 1, a preferred embodiment of the subject invention provides apparatus for monitoring the level of an electrically conductive liquid 14 having typically a volume resistivity in the megohm-centimeter range and being located in an electrically conductive container 12.

More specifically, this preferred embodiment resides in the improvement comprising, in combination, an electrically conductive tube 19 electrically connected to the container 12 and extending from outside of the container 12 from above the liquid 14 to an end 21 of the tube inside the container, and an elongate electric conductor extending through the tube 19 into the liquid 14 and having a free end 23 at a position corresponding to a predetermined low level of the liquid 14. As part of this combination, electric insulation 27 extends along the conductor 22 in the tube 19 and below the end 21 of that tube into the liquid 14 to isolate the free end 23 of the conductor 22 from the tube 19, as explained above. As a further part of this combination, monitoring circuit means 29 have an input terminal 31 electrically connected to the conductor 22 outside of the container 12 and a ground terminal electrically connected to that container.

According to the embodiment shown in FIG. 3, the subject invention provides an elongate electric conductor 22 with a length 34, relative to a point of reference 35, greater than the distance 36 between that point of reference and a predetermined low level 37 of the liquid 14 to be monitored. The invention according to this embodiment also electrically insulates the elongate conductor for a length which, relative to the point of reference 35, is greater than the distance 36. For instance, the invention according to this embodiment may provide the conductor 22 with electric insulation 27 for the length 34 of the conductor 22 as seen from the point of reference 35.

This embodiment of the invention then adjusts the length of the insulated conductor with respect to the point of reference 35 to a length equal to the distance 36 and provides the conductor at a position corresponding to the predetermined low level 37 relative to the point of reference 35 with an end 23 free of electric insulation 27 as shown in FIG. 1. The resulting insulated conductor 22 of diminished length 36 is then inserted into the container 12 to position the free end 23 at the location of the mentioned predetermined low level 37. The actual level of the liquid 14 is then electrically monitored with the inserted insulated conductor 22 exposed to the electrically conductive liquid 14 at the free end 23.

According to a related embodiment thereof, the subject invention provides an article of manufacture for monitoring the level of an electrically conductive liquid 14 in a container 12. The article of manufacture according to this embodiment comprises means for electrically monitoring the level of the liquid 14, including an elongate electric conductor 22 having a length 34 (see FIG. 3), relative to a point of reference 35, greater than the distance 36 between that point of reference and a predetermined low level 37 of the liquid 14. The conductor 22 of that article of manufacture is electrically insulated for a length, such as the above mentioned length 34, which, relative to the point of reference 35, is greater than the distance 36. Moreover, the insulated conductor in that article of manufacture is reducible to a length equal to a distance 36 between the point of reference 35 and the predetermined low level 37, to provide an end 23 of the conductor 22 free of electric insulation 27 at the predetermined low level 37 of the liquid 14.

The article of manufacture under consideration further includes means, such as a flange 39, connected to the insulated conductor 22 and 27 for mounting such insulated conductor relative to the point of reference 35.

Figure 4:
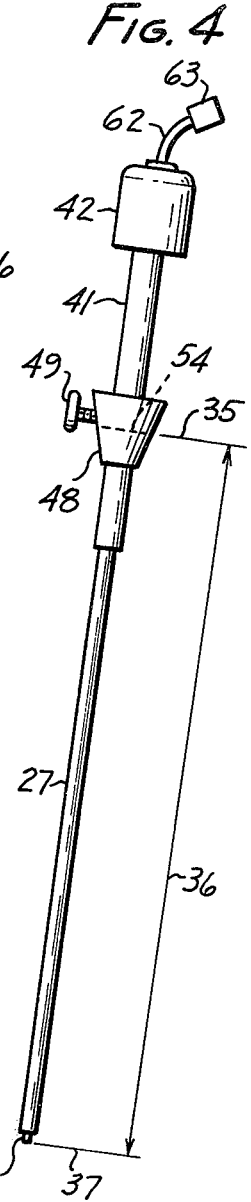
FIG. 4 is a side view of an adjustable electronic dipstick in accordance with a further embodiment of the subject invention.
Figure 5:
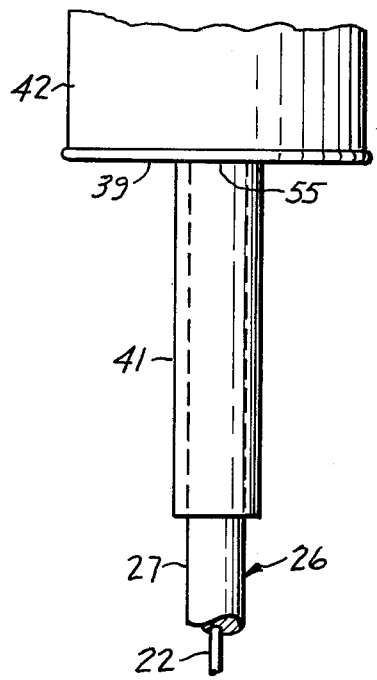
FIG. 5 is a detail view on an enlarged scale of the type of electronic dipstick shown in FIGS. 1, 3 and 4.

By way of example, and as seen in FIGS. 4 and 5, the electronic dipstick according to an embodiment of the invention may have a protective tubular coating 41, covering part of the electric insulation 27. In particular, the protective tubular coating 41 may be connected to the flange 39 which, in turn, preferably supports a can or container 42 housing at least part of the monitoring circuit 29.

In practice, the tubular coating 41 at least partially extends into the tube 19, thereby protecting the insulator 27 against chafing and other deleterious exposure at the upper end of the dipstick tube 19. To this end, the protective tubular coating 41 and the flange 39 are preferably manufactured of a durable metal or other tough, temperature-resistant material.

The electric insulation 27 typically is of a mechanically tough, temperature-resistant material of high electric resistance and a certain flexibility to accommodate bends in the dipstick tube 19. By way of example, suitable materials for the electric insulation 27 of the conductor 22 include polytetrafluorethylene (Teflon), polypropylene, and polyimide plastics. These materials are also reducible to the desired length 36, such as by means of a knife, saw blade or similar cutting instrument indicated at 44 in FIG. 3.

The reference point symbolized by the line 35 in FIG. 3 may, for instance, be the upper free end or top 45 of the dipstick tube 19, as shown in FIG. 1. That, in practice, corresponds to the innermost surface 46 of a cap 47 that is conventionally attached to a regular dipstick 25, as shown in FIG. 3. Prior to installation of an electronic dipstick according to an embodiment of the subject invention, the installer or customer may adapt the length thereof to the requirements of the particular engine.

In particular, the installer may use the existing dipstick as a guide, placing the innermost surface 46 of the cap 47 at the level of the reference point 35 or, for instance, of the lower surface of the flange 39. The installer may then take a tool 44 as shown in FIG. 3 and cut the conductor 22 and insulation 27 at a predetermined low liquid level 37 which may, for instance, be the ADD 1 QT mark of the dipstick 25 (see FIG. 2). If desired or necessary, a knife or similar instrument may be employed to recess the insulation 27 for a short distance at the free end 23 of the conductor 22 without, however, impairing the above mentioned isolation of the free end 23 from metallic parts, including the dipstick tube 19. Depending on the nature of the tool 44 used for cutting the insulation 27, such short recess at the free end 23 may be formed automatically, as in the case of insulation strippers employed for removing insulation from electrical wires. At any rate, provision of a short recess of the insulation has the advantage of precluding obstruction of the free conductor end 23 in case the insulation 27 should elongate itself somewhat on the wire 22, such as due to temperature or stress conditions.

The diminishing of the length of the insulated conductor as shown in FIG. 3 is one way in which the length of the insulated conductor 22 and 27 may be adjusted to the dimensions or requirements of a particular engine or other liquid container. Another way according to an embodiment of the invention includes the provision of a movable member defining the point of reference 35 as, for instance, in the case of certain universal oil dipsticks, and the setting of that movable member at the insulated conductor at the distance 36 from the free end 23. In that case, the free end 23 may be provided on the electronic dipstick at the factory.

With particular reference to FIG. 4, it is seen that the elongate insulated electric conductor is surrounded at or about the point of reference 35 with a movable member or stopper having a setting member or set screw 49. The protective tubular coating 41 is preferably provided on the insulated electric conductor 22 and 27 over the range of movement of the movable member or stopper 48.

Figure 6:
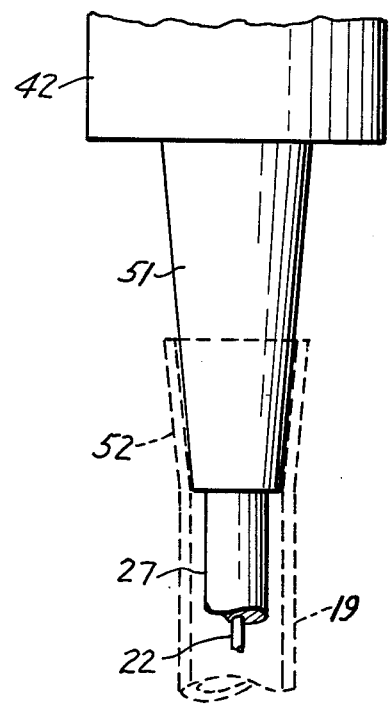
FIG. 6 illustrates a modification of the embodiment shown in FIG. 5, in accordance with a further embodiment of the subject invention.

The movable stopper 48 shown in FIG. 4, as well as the stationary stopper 51 shown in FIG. 6, are examples of members for covering the end 45 of the dipstick tube 19, opposite the end 21 inside the container 12, around the electric conductor 22. Such coverage or closure of the upper free end 45 of the dipstick tube according to the currently discussed embodiment of the subject invention represents an important feature, especially in the case of automotive engines or in the case of other applications where no liquid or vapor must escape from the dipstick tube.

By way of example, environmental protective laws and regulations require automotive engines to be equipped with positive crankcase ventilation [PVC]. In such ventilation systems, the intake manifold vacuum is employed to draw fumes out of the crankcase for application to the engine cylinders where such gases will be burnt along with the regular fuel charge. Sealing or closure of the dipstick tube 19 around the electronic dipstick according to an embodiment of the subject invention will not only avoid impairment of the positive crankcase ventilation through undesired entry of air via the dipstick tube, but will also prevent an escape of fumes or oil through the free tube end, such as in the case of conventional modern dipstick devices.

The movable stopper 48 or the stationary stopper 51 surrounding the insulated electric conductor is inserted into the upper end 45 of the tube 19 opposite the end 21 inside the container. The stopper may in particular be provided with a taper extending into the tube 19. This taper may, as shown in FIG. 6, be designed to fit into a corresponding taper of a flared end 52 of the tube 19. In other words, the stopper 48 or 51 extends in the direction of the lower free tube end 21, but is inserted into the upper free tube end 45 or 52.

The adjustable movable member defines the point of reference 35, such as by a surface similar to the innermost surface 46 of the cap 47 if that kind of adjustable member is employed, or by virtue of its maximum penetration into the straight or flared tube end if the movable member is a tapered or frusto-conical stopper.

By way of example, FIG. 4 shows a minor circle 54 of the tapered stopper 48 as defining the point of reference 35 relative to the free probe end 23. This minor circle 54 may, for instance, correspond to the uppermost end of the dipstick tube 19.

The movable member of stopper 48 is adjusted relative to the free probe end 23 until the distance between such free probe end and the reference circle 54 is equal to the above mentioned distance 36; the purpose of such relative adjustment being to provide an indication as more fully described below, when the oil or other liquid 14 has receded to an unsatisfactory level.

As the article of manufacture shown in FIG. 3, the electronic dipstick illustrated in FIG. 4 also has a length greater than the desired distance 36 between the point of reference 35 and a predetermined low level 37 of the liquid. In particular, the point of reference 54 indicated in FIG. 4 moves along with the adjustable member 48, so that the length of the elongate electric conductor, relative to the point of reference 54, initially is actually or potentially greater than the desired distance 36, until the movable member 48 has been set at its proper position for the particular engine.

In general, the embodiment of FIG. 4 presents an article of manufacture for monitoring the level of an electrically conductive liquid in a container.

This article of manufacture comprises, in combination, means for electrically monitoring the level of the liquid 14, including an elongate electric conductor having a length, relative to a point of reference 54, greater than the distance 36 between the point of reference 35 and a predetermined low level 37 of the liquid 14. Also, the elongate conductor is electrically insulated for a length which, relative to the point of reference 54, is greater than the distance 36, and is adjustable to a length equal to that distance 36 between the point of reference 35 and the predetermined low level 37 to provide an end 23 of the conductor free of electric insulation 27 at that predetermined low level 37 of the liquid 14. The stopper 48 in the embodiment of FIG. 4 then presents means connected to the insulated conductor for mounting the insulated conductor relative to the point of reference 35. This is done in the embodiment of FIG. 4 by rendering the stopper 48, which defines a reference point 54, adjustable relative to the elongate insulated electric conductor.

The embodiment of FIG. 4 is particularly advantageous if a manifold or other source of heat adjacent to the dipstick tube would adversely affect the monitor circuitry in the can 42. In that case, the can 42 with enclosed monitor circuitry may be considered adjustable relative to the reference point 35 or 54 or free tube end 45 or 52, by virtue of the stopper 48 with set screw 49.

In other words, the embodiment of FIG. 4 enables the can 42 with enclosed monitor circuitry 29 to be positioned at a safe distance from any source of heat or other adverse influence. In this respect, the features of FIG. 3 including an initially excessive, diminishable length of the insulated conductor, and of FIG. 4, including the adjustability of the reference point 54, may be combined in one and the same electronic dipstick for an increased universality of its utility in various engine or liquid container types under various thermal and other environmental circumstances.

According to a preferred embodiment of the subject invention, the electrical monitoring or at least a substantial part thereof is effected at an end of the insulated conductor opposite its free end 23. In terms of FIGS. 1 and 3 to 7, the electrical monitoring function is performed at the top of the electronic dipstick.

The monitoring circuit and its container 42 are thus preferably supported at the upper end 55 of the elongate electric conductor opposite its free end 23. To this end, the electric conductor according to an embodiment of the subject invention is sufficiently stiff to carry the monitoring circuit means 29 and 42.

This is particularly important if the electronic dipstick is adjustable as in FIG. 4, whereby the can 42 with enclosed monitoring circuit may be located at a distance from the adjustable member 48 and dipstick tube 19.

On the other hand, the protective coating or tube 41, flange or baseplate 39, or stopper 48 or 51 may serve as means for mounting the monitoring circuitry on an end 45 of the dipstick tube 19 opposite its end 21 inside the container 12. In the alternative, the flange or baseplate 39, the protective coating or tubular member 41 or the tapered stopper 51 may serve as a means for mounting the monitoring circuitry on or at an end of the elongate conductor 22 opposite its free end 23.

If desired, the monitoring circuitry may be located closer to or at the dashboard of the vehicle and may be connected to the dipstick conductor by a preferably shielded cable; provided no undue interference is picked up thereby. To avoid such danger, the electronic circuitry for the dipstick may be composed of two parts, namely a monitor circuit 29 preferably enclosed in the can 42 and an indicator unit 61 mounted on or about the dashboard of the particular vehicle or at a control panel in the case of a stationary engine.

The monitor circuit 29 is connected to the indicator unit 61 via a cable 62 and connector 63 including connector elements 64 for the ground 32, 65 for a voltage supply 66 and 67 for an output of the monitor circuit 29 and input of the indicator unit 61. The ground 32 may be either connected directly to the monitor circuit 29 as shown in FIG. 7, or indirectly via the connector element 64. In either case, the monitor circuit 29 and indicator unit 61 have a common ground via the connector element 64, and such ground is also common with the liquid container 12 via the engine frame and other metallic parts of the particular vehicle.

The monitor circuit 29 includes an operational amplifier 71 having an inverting input 72 and a noninverting input 73 connected to a bridge circuit 74.

The bridge circuit 74 is energized from a voltage divider including resistors 75 and 76 connected between the positive voltage supply and ground so as to appropriately reduce the supply voltage which, in practice, may be the battery voltage of the particular vehicle or engine installation.

The bridge circuit includes a first leg comprising resistors 77 and 78 connected in series between the junction of the voltage divider resistors 75 and 76 and ground. This provides a reference voltage for the operational amplifier at a junction 79 between the bridge resistors 77 and 78. The junction 79 is connected via a resistor 81 to the inverting input 72 of the operational amplifier 71. The resistors 78 preferably has a resistance several times higher than the resistor 77, so that most of the voltage appears across the resistor 78.

The second leg of the bridge circuit 74 has a resistor 82 and such resistance as present between the probe 22 and grounded container 12. A junction of the probe 22 and resistor 82 is connected to the non-inverting input 73 of the operational amplifier 71. In the embodiment illustrated in FIG. 7, it is the input terminal 31 of the monitor 29 that is connected to the operational amplifier input 73.

A significant advantage of the illustrated circuitry is that the resistor 82 can have a very high value, such as into the onehundred megohm range, whereby any arcing at the probe end 23 is precluded.

This stands in favorable contrast to prior-art proposals in which no safeguard against electric arcing was provided. Of course, any electric spark or undue heat development in the engine crankcase or in other environments containing combustible liquids and fumes should be strictly avoided.

The monitoring and level sensing equipment herein shown in compliance with best mode requirements is suited to operation with liquids having volume resistivities in the megohm-centimeter range. This in contrast to prior-art proposals, in which lubricating oils and other high-resistivity liquids were considered or in fact operated as electric insulators, rather than conductors.

The output of the operational amplifier 71 is connected via the connector element 67 and an indicator input 84 to bases of driver transistors 85 and 86 in the indicator unit 61. These transistors 85 and 86 are connected in series between the positive voltage supply and ground and are of the NPN and PNP type, respectively.

Two light-emitting diodes 87 and 88 are connected in parallel between the junction between transistors 85 and 86 and the junction between resistors 91 and 92 connected in series between the positive power supply and ground.

Operation of the electronic dipstick is initiated by depression of a push button 93 which temporarily connects the circuitry 29 and 61 to the power supply 66.

This applies electric current to the bridge 74 via voltage divider 75 and 76 and also energizes the operational amplifier 71 which thus commences to act as an electric current or voltage comparator.

In particular, if there is no oil in the crankcase, or if such oil has receded to a level below the free end 23 of the probe 22, the resistance between the terminals 31 and 32 is practically at infinity and the operational amplifier 71 applies a high output to the indicator input 84. This turns on the NPN transistor 85, while turning off the PNP transistor 86. Accordingly, the red light emitting diode 87 is energized and by its display to the driver or operator indicates a deficiency, namely the deficient oil condition in this instance.

On the other hand, if the button 93 is depressed while part of the probe 22 is immersed in the oil 14, then the terminal 31 and input 73 of the operational amplifier 71 see a resistance considerably less than infinity. By way of example and not by way of limitation, the resistance through the oil between the container 12 and probe 22 may be, say, one-thousand megohms in the case of typical lubricating oils. If the power supply 66 is a 12 volt battery, the voltage at the amplifier input 73 may then be about 7.7 volts, while the voltage at the reference input 72 may be 9.12 volts, for instance. This causes the operational amplifier 71 to apply a low output to the indicator input 84, turning off the NPN transistor 85, while turning on the PNP transistor 86. In consequence, the green light emitting diode 88 is energized and turns on, while the red diode 87 is maintained off.

The operator or driver is thus apprized of the crankcase oil level condition upon each depression of the push button 93.

The subject invention and its various embodiments may, of course, be employed for monitoring liquids other than lubricating oils. In these cases, the extension of the insulation down to the free end 23 of the conductor or probe 22 not only has the advantage of isolating the probe effectively from adjacent metallic parts, such as the tube 19 as mentioned above, but also enables the probe to see an oil resistance largely unaffected by the degree of immersion of the probe into the oil 14 or other liquid being monitored. This may be particularly important for a reliable monitoring of high-resistivity liquids and oils where extremely sensitive monitoring equipment could unduly respond to resistance fluctuations due to variations in the degree of probe immersion.

Though the electronic dipsticks or probes shown in FIGS. 1 and 3 to 6 are highly advantageous for various purposes, it should be understood that the circuitry according to FIG. 7 has utility with other kinds and types of probes.

Also, the resistor component 77 may in practice be saved and dispensed with if the junction 79 is directly connected to the lower end of the resistor 76, as shown by the dotted line 80, whereby the resistors 75, 76 and 78 form a voltage divider, with the lead 80' between the lower ends of the resistors 76 and 78 being omitted in that case.

By way of example, the component 71 in the monitor circuit 29 may be a wide bandwidth JFET input operational amplifier of the type LF351 as shown and described, for instance, in the brochure entitled "LF351 Wide Bandwidth JFET Input Operational Amplifier," by National Semiconductor Corporation (1977).

The subject extensive disclosure will suggest and render apparent to those skilled in the art various modifications and variations within the spirit and scope of the subject invention.

We claim:

1. In a method of monitoring the level of an electrically conductive liquid in a container, the improvement comprising in combination the steps of:
   providing an elongate electric conductor with a length, relative to a point of reference, greater than the distance between said point of reference and a predetermined low level of said liquid;
   electrically insulating said elongate conductor by providing said elongate conductor with electric insulation for a length which, relative to said point of reference, is greater than said distance;
   cutting said conductor and said electric insulation at said predetermined low liquid level to diminish the length of said insulated conductor with respect to said point of reference to a length equal to said distance and providing said conductor at a position corresponding to said predetermined low level relative to said point of reference with an end free of electric insulation;
   inserting said insulated conductor of diminished length into said container to position said free end at the location of said predetermined low level; and
   electrically monitoring the level of said liquid with said inserted insulated conductor exposed to said electrically conductive liquid at said free end.

2. A method as claimed in claim 1, including the step of:
   adjusting the length of said insulated conductor with respect to said point of reference to a length equal to said distance.

3. A method as claimed in claim 1, including the step of:
   providing said elongate insulated electric conductor at said point of reference with a protective tubular coating having a length shorter than said adjusted length.

4. A method as claimed in claim 1, including the step of:

surrounding said elongate insulated electric conductor at said point of reference with a stopper.

5. A method as claimed in claim 4, including the step of:
providing said stopper with a taper extending in the direction of said free end.

6. A method as claimed in claim 2 wherein:
said adjusting of the length of said insulated conductor includes the step of diminishing the length of said insulated conductor with respect to said point of reference to a length equal to said distance.

7. A method as claimed in claim 2, wherein:
said adjusting of the length of said insulated conductor includes the steps of providing a movable member defining said point of reference, and setting said movable member at said insulated conductor at said distance from said free end.

8. A method as claimed in claim 7, including the step of:
providing said elongate insulated electric conductor with a protective tubular coating over a range of movement of said movable member.

9. A method as claimed in claim 2, wherein:
said adjusting of the length of said insulated conductor includes the steps of providing around said insulated conductor a movable stopper defining said point of reference, and setting said movable stopper at said distance from said free end.

10. A method as claimed in claim 9, including the step of:
providing said elongate insulated electric conductor with a protective tubular coating over a range of movement of said movable stopper.

11. A method as claimed in claim 2, wherein:
said electrical monitoring is effected at an end of said insulated conductor opposite said free end.

12. In a method of monitoring, with the aid of a monitoring circuit having an input terminal and a ground terminal, the level of an electrically conductive liquid having a volume resistivity in the megohm-centimeter range and being located in a bottom region of an electrically conductive container, the improvement comprising in combination the steps of:
providing an electrically conductive tube;
electrically connecting said tube to the container and extending said tube from the outside of the container from above said liquid to an end of said tube inside the container;
extending an elongate electric conductor through said tube into said liquid and providing said conductor with a free end at a position corresponding to a predetermined low level of said liquid;
providing said conductor with electric insulation extending along said conductor in said tube and isolating said free end of said conductor from said tube by extending said insulation from said tube to below said end of said tube;
electrically connecting said input terminal to said conductor outside of said container;
electrically connecting said ground terminal to said container; and
supporting said monitoring circuit at an end of said elongate electric conductor opposite said free end.

13. A method as claimed in claim 12, including the step of:
providing said elongate insulated electric conductor with a protective tubular coating extending into said tube.

14. A method as claimed in claim 12, including the step of:
covering an end of said tube, opposite said end inside the container, around said electric conductor.

15. A method as claimed in claim 12, including the steps of:
surrounding said elongate insulated electric conductor with a stopper; and
inserting said stopper into an end of said tube opposite said end inside the container.

16. A method as claimed in claim 15, including the step of:
providing said stopper with a taper extending into said tube.

17. A method as claimed in claim 15 or 16, including the step of:
rendering said stopper adjustable relative to said elongate electric conductor.

18. A method as claimed in claim 12, including the step of:
enclosing said monitoring circuit in a container supported at said end of said elongate electric conductor opposite said free end.

19. In apparatus for monitoring the level of an electrically conductive liquid in a container, the improvement comprising in combination:
an elongate electric conductor extending into said container and having a free end exposed to said liquid;
electric insulation covering said conductor up to said free end;
means connected to said conductor for electrically monitoring the level of said liquid with said conductor covered by said electric insulation and exposed to said electrically conductive liquid at said free end;
means for supporting said monitoring means at an end of said insulated conductor opposite said free end; and
a container enclosing said monitoring means at said end of said insulated conductor opposite said free end.

20. Apparatus as claimed in claim 19, including:
a protective tubular coating covering part of said electric insulation.

21. Apparatus as claimed in claim 19, including:
a stopper surrounding said elongate insulated electric conductor remotely from said free end.

22. Apparatus as claimed in claim 21, wherein:
said stopper has a taper extending in the direction of said free end.

23. Apparatus as claimed in claim 21, wherein:
said stopper is adjustable along part of said elongate insulated electric conductor.

24. Apparatus as claimed in claim 19, wherein:
said electric conductor is sufficiently stiff to carry said monitoring means.

25. In apparatus for monitoring the level of an electrically conductive liquid having a volume resistivity in the megohm-centimeter range and being located in an electrically conductive container, the improvement comprising in combination:
an electrically conductive tube electrically connected to the container and extending from outside of the container from above said liquid to an end of said tube inside the container;
an elongate electric conductor extending through said tube into said liquid and having a free end at a position corresponding to a predetermined low level of said liquid;

electric insulation extending along said conductor in said tube and below said end of said tube into said liquid to isolate said free end of said conductor from said tube;

monitoring circuit means having an input terminal electrically connected to said conductor outside of said container and a ground terminal electrically connected to said container; and means for mounting said monitoring circuit means on an end of said tube opposite said end inside the container.

26. Apparatus as claimed in claim 25, including:
a protective tubular coating on said elongate insulated electric conductor extending into said tube.

27. Apparatus as claimed in claim 25, including:
means extending around said electric conductor for covering an end of said tube opposite said end inside the container.

28. Apparatus as claimed in claim 25, including:
a stopper surrounding said elongate insulated electric conductor and extending into said tube at an end opposite said end of said tube inside the container.

29. Apparatus as claimed in claim 28, wherein:
said stopper has a taper extending into said tube.

30. Apparatus as claimed in claim 28 or 29, wherein:
said stopper is adjustable along part of said elongate insulated electric conductor.

31. Apparatus as claimed in claim 25, wherein:
said electric conductor is sufficiently stiff to carry said monitoring circuit means.

32. Apparatus as claimed in claim 25, including: a container enclosing said monitoring circuit means on end of said tube opposite said end inside the container.

33. Apparatus as claimed in claim 32, wherein: said mounting means include a tubular member surrounding part of said electric conductor and a flange connected to said tubular member and supporting said container.

34. An article of manufacture for monitoring the level of an electrically conductive liquid in a container, comprising in combination:

means for electrically monitoring the level of said liquid including an elongate electric conductor having a length, relative to a point of reference, greater than the distance between said point of reference and a predetermined low level of said liquid, being electrically insulated for a length which, relative to said point of reference, is greater than said distance, and being adjustable to a length equal to a distance between said point of reference and said predetermined low level to provide an end of said conductor free of electric insulation at said predetermined low level of said liquid and electric monitoring circuit means connected to an end of said conductor opposite said free end; and means connected to said insulated conductor for mounting said insulated conductor relative to said point of reference and for mounting said monitoring circuit means on said opposite end of said conductor.

35. An article of manufacture for monitoring the level of an electrically conductive liquid in a container, comprising in combination:

means for electrically monitoring the level of said liquid including an elongate electric conductor having a length, relative to a point of reference, greater than the distance between said point of reference and a predetermined low level of said liquid, being electrically insulated for a length which, relative to said point of reference, is greater than said distance, and being reducible to a length equal to a distance between said point of reference and said predetermined low level to provide an end of said conductor free of electric insulation at said predetermined low level of said liquid and electric monitoring circuit means connected to an end of said conductor opposite said free end; and means connected to said insulated conductor for mounting said insulated conductor relative to said point of reference and for mounting said monitoring circuit means on said opposite end of said conductor.

36. An article as claimed in claim 34 or 35, including:
a protective tubular coating covering part of said electric insulation.

37. An article as claimed in claim 34 or 35, including:
a stopper surrounding said elongate insulated electric conductor remotely from said free end.

38. An article as claimed in claim 37, wherein:
said stopper has a taper extending in the direction of said free end.

39. An article as claimed in claim 37, wherein:
said stopper is adjustable along part of said elongate insulated electric conductor.

40. An article as claimed in claim 34 or 35, wherein:
said mounting means include means for mounting said monitoring circuit means at said point of reference.

41. An article as claimed in claim 34 or 35, including:
a conductor enclosing said electric monitoring circuit means on said end of said conductor opposite said free end.

42. An article as claimed in claim 34 or 35, wherein:
said means including said elongate electric conductor have sufficient stiffness to carry said monitoring circuit means at said opposite end.

* * * * *